United States Patent [19]

Smithline

[11] Patent Number: 5,390,320
[45] Date of Patent: Feb. 14, 1995

[54] AUTOMATICALLY CONVERTING STRUCTURED ANALYSIS TOOL DATABASE OUTPUTS INTO AN INTEGRATED SIMULATION MODEL VIA TRANSPORTABLE STANDARDIZED METAFILE

[75] Inventor: Edward T. Smithline, Port Washington, N.Y.

[73] Assignee: Grumman Aerospace Corporation, Bethpage, N.Y.

[21] Appl. No.: 237,317

[22] Filed: May 3, 1994

Related U.S. Application Data

[63] Continuation of Ser. No. 644,028, Jan. 22, 1991.

[51] Int. Cl.⁶ .............................................. G06F 15/00
[52] U.S. Cl. .................................. 395/500; 364/221.2; 364/DIG. 1
[58] Field of Search ............................... 395/600, 500

[56] References Cited

U.S. PATENT DOCUMENTS

| | | | |
|---|---|---|---|
| 4,928,221 | 5/1990 | Belkhiter | 364/474.25 |
| 4,956,773 | 9/1990 | Saito et al. | 395/159 |
| 5,051,938 | 9/1991 | Hyduke | 364/578 |
| 5,075,847 | 12/1991 | Fromme | 395/700 |
| 5,084,824 | 1/1992 | Lam et al. | 301/578 |
| 5,119,465 | 6/1992 | Jack et al. | 395/500 |
| 5,129,046 | 7/1992 | Tanabe et al. | 395/100 |
| 5,148,379 | 9/1992 | Konne et al. | 395/916 |
| 5,151,984 | 9/1992 | Newman et al. | 395/500 |

OTHER PUBLICATIONS

"Pict: An Interactive Graphical Programming Environment", Computer, IEEE 1984, Ephraim P. Glinert and Steven L. Tanimoto, pp. 7-25.

Primary Examiner—Robert B. Harrell
Assistant Examiner—Timothy Lee Philipp
Attorney, Agent, or Firm—Scully, Scott, Murphy & Presser

[57] ABSTRACT

A method for automatically converting structured analysis tool outputs into an executable simulation model is disclosed. The method basically comprises a two step process. The first step in the process involves converting the outputs from anyone of a variety of structured analysis tools into a standard METAfile. This first step is accomplished through the use of a METAfile Conversion Program, which accesses the data bases of the various structured analysis tools and collects the necessary data. The second step in the process involves converting the standard METAfile into an executable simulation model. This second step is accomplished through the use of a Simulation Generation program, which accesses the standard METAfile and in a step by step process converts the blocks of METAfile data into simulation code in any of the standard simulation languages.

24 Claims, 9 Drawing Sheets ic model format and the simula
AUTOMATICALLY CONVERTING STRUCTURED ANALYSIS TOOL DATABASE OUTPUTS INTO AN INTEGRATED SIMULATION MODEL VIA TRANSPORTABLE STANDARDIZED METAFILE This is a continuation of copending application Ser. No. 07/644,028, filed on Jan. 22, 1991.

BACKGROUND OF THE INVENTION

1. Field of the Invention

This invention relates to a method for automatically generating a simulation model from previously created structured analysis tools, and more particularly, to a method for automatically generating simulation models from previously created data flow diagrams and utilizing this simulation model as a tool for the design, integration and testing of the particular system being implemented by replacing components of the simulation model with the actual hardware/software components in short incremental steps. The simulation model can be created using any of the standard simulation languages on a plurality of host computers.

2. Discussion of the Prior Art

The fields of structured analysis and simulation modeling are an increasingly important technology due to the ever increasing complexity of systems to be designed. The purpose of both structured analysis and simulation is to design a realistic and accurate model of the particular system to be designed. The design of a realistic and accurate system is accomplished by performing an allocation of system functions. Structured analysis performs an allocation of system functions in order to implement the system, and simulation models perform an allocation of system functions in order to execute and analyze a model of the system. Basically, in the design of any multifaceted system, the use of structured analysis and simulation is indispensable regardless of how simplistic the system may appear to be. The concept behind these procedures is to first break the problem or system design requirements into smaller and more manageable parts, find a solution for each part, and then rebuild the parts into a complete and functioning system.

Analysis is the study of a problem prior to taking action to solve the problem. Structured analysis is a particular form of analysis which uses a set of standardized tools to partition the problem into smaller parcels such that they become more manageable. The primary tools of structured analysis are data flow diagrams, data dictionaries, and mini-specifications. Structured diagramming techniques support a top-down, structured development approach to problem solving with various levels of decomposition and thus various levels of detail for the particular system can be achieved. Early structured analysis tools were largely long hand procedures utilizing pencil and paper techniques. However, with the advent of widely available, multipurpose graphics terminals, structured analysis diagramming has become a quick and efficient automated process. A variety of vendors, including Cadre and Tektronix, have easy to use, commercially available structured analysis programs. These automated tools provide an efficient means for creating and updating structured analysis outputs which are the first step in generating a finished product from the initial problem or design requirements.

Simulation and modelling are widely accepted techniques whereby prior to actually building or constructing the particular product, a simulation or model is constructed to see if the product functions as envisioned and whether or not it is a feasible design. Modelling is the older of the two techniques and involves actually building a prototype of the product. This prototype or model may or may not be a fully working model or even built to scale, but rather, it typically is used to be representative of the particular product. This model would be subjected to various tests in order to determine if the design was sound and feasible. As time progressed, and the use of computers was becoming more prevalent, software routines were written to simulate the workings of hardware and software components that comprised the particular product. Today, simulation is a design-aid tool that has been in existence for nearly thirty years and is a highly exact science. This breakthrough has had an incredible impact on designing techniques; namely, by being able to simulate the product on a computer, a model that in all probability would not function, would not have to be built. The product could be simulated on the computer, tested and have a majority of the bugs worked out before the prototype was built. Although simulation time is somewhat expensive and time consuming, it represents an improvement in having to continuously build prototypes to work out the problems encountered.

The design of a particular system starts with the basic system concepts, the general idea of what is to be designed and what is expected of the design. Once the system concepts are fairly well established, the design of the system follows two diverging paths; namely, the hardware development path and the software development path. Basically, the two paths are similar in concept, but differ in the actual implementation of the various stages along the paths. The software development path starts with the system software requirements analysis and proceeds through software requirements analysis, preliminary design, detailed design, coding unit and CSC integration testing, and ends with the computer software configuration item testing. The hardware development path starts with the system hardware requirements analysis and proceeds through hardware requirements analysis, preliminary design, detailed design, fabrication and ends with the hardware configuration item testing. The basic tool utilized to go from the system concepts stage to the configuration item testing stage is structured analysis. Once this phase is completed, the next step would be to use system modelling through simulation to test the system, and finally to build, fabricate or code the finished product, namely, the completed and functional system. Currently, the use of structured analysis and system modelling have been separate and distinct steps in the design process, one to be used after the desired result is achieved with the other.

SUMMARY OF THE INVENTION

The present invention is directed to a method for automatically converting structured analysis tool outputs into an executable simulation model. The method comprises the steps of automatically generating a METAfile from a data base of the structured analysis tools and automatically generating a simulation model from the generated METAfile. The METAfile contains inter-element relations in a format suitable for reconstruction into simulation model format and the simulation model comprises simulation source code statements. The method for automatically converting structured analysis tool outputs into an executable simulation model further comprises the step of automatically integrating actual code into said simulation model by replacing the simulation component representing code with actual code. As a consequence of the entire procedure, at the end of the conversion the actual system will have been implemented and tested using the model as the basis for the implementation.

The method for automatically converting structured analysis tool outputs into an executable simulation model is, as described above, a two step process. The first step in the process is converting the outputs from a variety of structured analysis tools into a standard METAfile. A METAfile Conversion Program, MCP, is utilized to accomplish this first step. The MCP accesses the data bases of the various tools and collects the necessary data. Once the data is collected, the MCP reorganizes the data into a standard METAfile format for further use. The second step in the process is the conversion of the METAfile into an executable simulation model. A Simulation Generation Program, SGP, is utilized to accomplish this second step. The SGP accesses the METAfile and in a step by step process converts the various blocks of data contained in the METAfile into simulation code utilizing any of the standard simulation languages.

This method is feasible because of the similarity in relationship between the components used in structured analysis to define the functions of the system being designed, and the components used in simulation to define the functions of the system being simulated. The most common structured analysis tool used is the data flow diagram. It comprises five basic elements namely; sources, sinks, transformations or processes, data flows and files. As the description of this invention progresses, it will be shown that there is a one-to-one correspondence between the number of elements in data flow diagrams and simulation models, and it is this correspondence that makes the conversion possible. It should be noted that any and all structured analysis components can and will be used, as required, to fully define the system being simulated, including process specifications, structure charts, etc.

The present invention provides a method for automatically generating a source code simulation model from previously created data flow diagrams. The executable simulation model can be implemented in any of the standard simulation languages such as Simscript, Network II.5 and GPSS. In having the simulation model implemented in any of the standard languages, compliance with any government simulation requirement can be met with increased ease and speed. Once the METAfile is created, using the METAfile Conversion Program, from the data flow diagrams, it can be transferred to any host computer system having the simulation generation program resident. The automatic conversion direct from the data flow diagrams assures a correct and accurate representation of the system to be designed. The entire process is less costly then the current approach for creating comparable models because a simulation expert will not be needed to construct the model. In addition, since it is an automatic process, the time to generate the model will be greatly reduced and thus the design of the model can be deferred till the data flow diagrams become available.

The present invention also provides a means and method for using the simulation model as a tool for the design, integration and testing of the system being implemented by replacing components of the simulation model with the actual hardware/software components in short incremental steps. The incremental incorporation of the actual components, hardware/software, of the system into the model simplifies overall system integration and testing. This incremental process provides for a time saving and cost effective method of accurately testing system operation one step at a time.

DETAILED DESCRIPTION OF THE PREFERRED EMBODIMENTS

Figure 1:
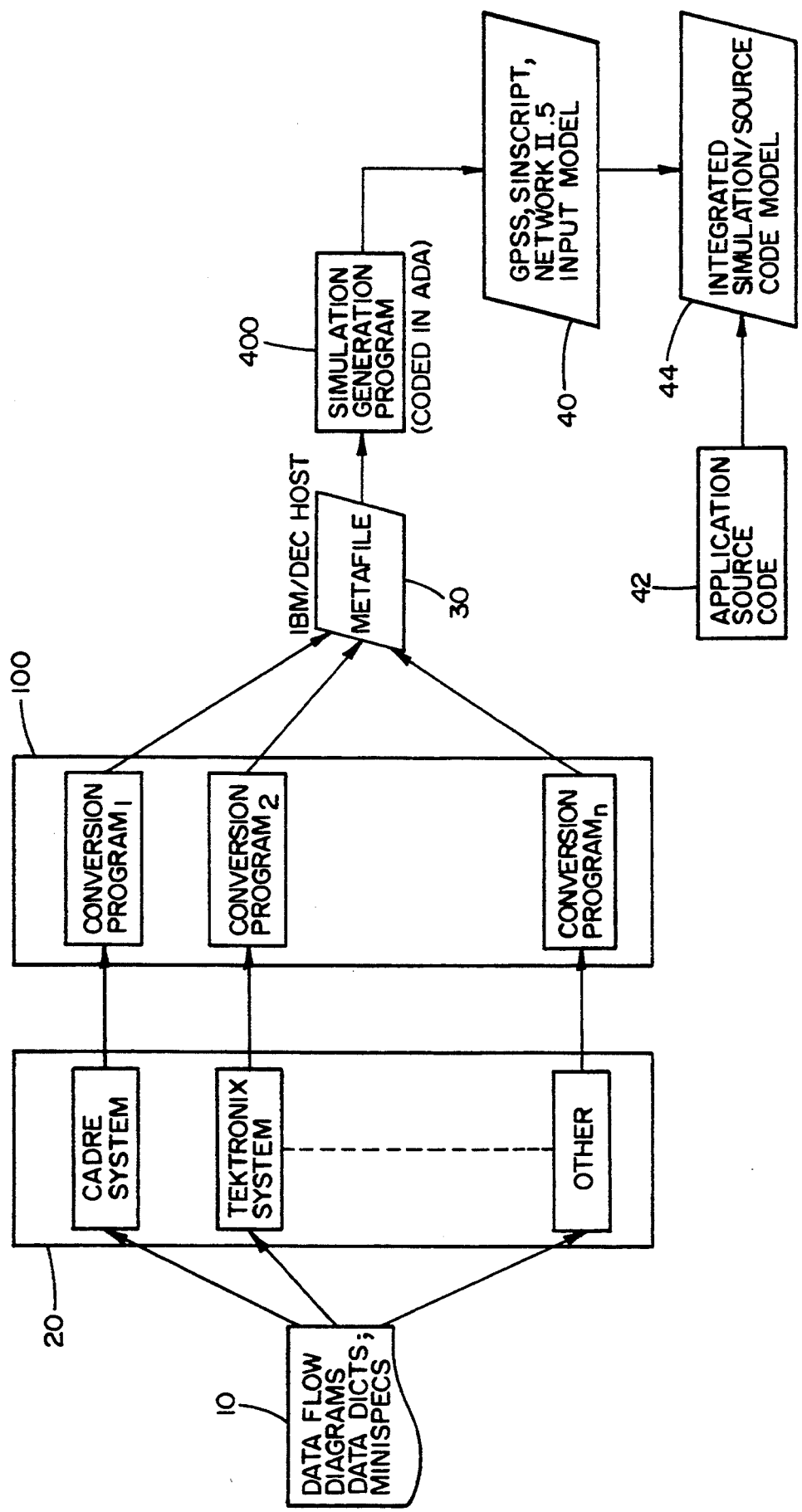
FIG. 1 is a block diagram illustrating the method utilized in the present invention.

The present invention is directed to a method for automatically generating a simulation model from previously created data base outputs from a variety of structured analysis tools. The method further includes a procedure for using this simulation model as a tool for the design, integration and testing of the system being implemented by replacing components of the simulation model with the actual hardware/software components in short incremental steps. As a consequence of the entire procedure, at the end of the conversion the actual system will have been implemented and tested using the model as the basis for the implementation.

Analysis in general terms is the study of a particular problem prior to taking any action towards solving the problem. Structured analysis is a form of analysis which utilizes certain tools to partition the problem into smaller parcels such that they are more easily managed. The basic tools of structured analysis are data flow diagrams, data dictionaries, and mini-specifications. The data flow diagram is basically a network representation of a system, wherein the system may be automated, manual or a combination of automated and manual. The data flow diagram portrays the system in terms of its component parts. The data dictionary contains the set of definitions of all the data flow diagram elements. The mini-specification is a tool for defining small portions of the data flow diagrams. The mini-specification can use such other tools as structured English, decision tables and decision trees to describe the logic and policy in the data flow diagrams. A complete description of the aforementioned structured analysis tools is given as the workings of the invention are disclosed.

Simulation is a design-aid tool that has been in existence in the computer field for almost thirty years. Simulation packages are comprised of programs that enable a user to describe or model a system, hardware and software, prior to implementation in order to provide vital information about the system to assist in decision making. Simulation models provide assistance in design decision making by highlighting system problem areas, determining hardware/software bottlenecks, providing critical system statistical information and providing processor and memory sizing information.

There are basically two types of simulations; namely, "behavioral" and "real time". "Real time" simulations are concerned with testing actual system hardware and software in a test environment that approximates the actual system environment to determine if the system operates as specified and meets requirements. This entails implementing a test environment that interacts with the system under test similarly to the manner in which the actual interfacing systems would interact. This test environment would consist of fairly well-defined hardware and software components. "Behavioral" models are concerned with simulating the behavior of the system to be implemented in order to determine system traffic and possible bottlenecks. This information is then used to assist in determining design criteria. To create the behavioral model, system processes, storage devices and transfer devices are defined in relation to one-another, and the model developed from these relationships. Other information is required to complete the model, such as data input distributions that are required to determine data arrival times, expected data processing times, data base organization and size, and other additional information as required to complete the model. As more information about the system's characteristics are uncovered, the model is refined, and ultimately resembles and acts similarly to the proposed system.

The present invention is concerned with developing an operational "behavioral" simulation model, with all required inputs/outputs and processing elements by utilizing previously created structured analysis data bases comprised of data flow diagrams, data dictionaries and other components of the structured analysis data base as provided by those automated systems. The present invention also allows for the replacement of components of the simulation model with the actual software code as it is completed and tested. In this manner, the model will incrementally be replaced by the actual system components until it becomes that system, fully integrated and tested.

A data flow diagram is comprised of five basic elements, sources of data into the system, sinks or recipients of data leaving the system, transforms or processes which convert data, data flows which define the data passing between transformations, and files in which data is stored. Simulation models are comprised of three basic elements, processing elements which are characterized by their instruction set and cycle time, transfer devices which are characterized by their data transfer rate, data transfer protocol and connections, and data storage devices which are characterized by capacity, access time, and access method. The first two elements of the data flow diagrams, sources and sinks can be readily simulated by the use of GPSS GENERATE and TERMINATE blocks. A complete description of these blocks is given in subsequent paragraphs. The three remaining elements of a data flow diagram can be simulated with the three elements comprising a simulation model. Basically, processing elements are substituted for transformations, data transfer devices are substituted for data flows and data storage devices are substituted for files. As a result, it is possible to design a behavioral simulation model utilizing data flow diagrams as the basis for the design. Given that it is possible to design a simulation model utilizing data flow diagrams, then it is also possible that the system be designed so it is capable of automatically generating a behavioral simulation model from data flow diagrams with a new model capable of being produced automatically from the structural analysis tool used to produce the data flow diagram code. This enables updating of the simulation model automatically to the latest version of the data flow diagram model, ensuring the model is truly representative of the actual system. One such-tool that could be adapted is the Teamwork System used for generating Yourdon-like data flow diagrams with an interface implemented between it and the simulation model.

Referring to FIG. 1, there is shown a block diagram of the overall simulation conversion process. Block 10 represents the various structured analysis inputs that are to be transformed into a simulation model. The structured analysis inputs of block 10 are entered into the data base through block 20 which represents the various automated structured analysis tools. The data base output of the various systems included in block 20 are input into block 100. Block 100 represents the output of a plurality of METAfile Conversion Programs utilized to automatically convert the data base created by any of the automated tools of block 20 to a standard METAfile format. The METAfile will contain inter-element relationships in a format suitable for reconstruction into simulation model format. The METAfile is shown as block 30 in the figure. The METAfile 30 can be realized on a variety of computers such as the IBM Series 14300 Model 1 and the DEC VAX 8600. The METAfile 30 is then fed into the Simulation Generation Program represented by block 400. The Simulation Generation Program 400 converts the METAfile 30 into a basic simulation model which can be in any of the standard simulation source languages. The simulation model is shown in the figure as block 40. The final step in the overall process, the integration of actual software into the simulation model, is represented in the figure by block 44. As can be seen from the figure, block 44 is comprised of any of the standard simulation source languages from block 40 and actual source code from block 42. The actual source code can be in any language such as FORTRAN or ADA.

A METAfile is a standardized output file produced after analysis of the structured analysis data base files that are created by the various vendors in order for them to regenerate the respective data flow diagrams, data dictionaries, mini-specifications, and state transition diagrams that are used in structured analysis design. These data base files are analyzed by the METAfile Conversion Program 100, MCP, shown in FIG. 7, which reformats the files so they may be used as input to the Simulation Generation Program, SGP 400, shown in FIG. 10. A complete description of these two programs is given in subsequent paragraphs. The reason for standardizing the output of the MCP 100 is so that which ever data base input source, Teamwork, Tektronix, or other system, is used, the converted output from each of those systems will be in precisely the same format so that only one SGP is necessary to compile that output into the desired simulation source language. In having a standardized METAfile, only one SGP need to be coded regardless of the input source; however, one MCP has to be coded for each different structured analysis vendor input. The reason for having different MCP's for different structured analysis tools is because there are differences between various vendors tools in the way they internally store their information. Once the METAfile is created, it can be transported and used as input on any processing system that has an SGP running on it. Numerous examples of METAfiles are given in subsequent paragraphs.

Figure 2:
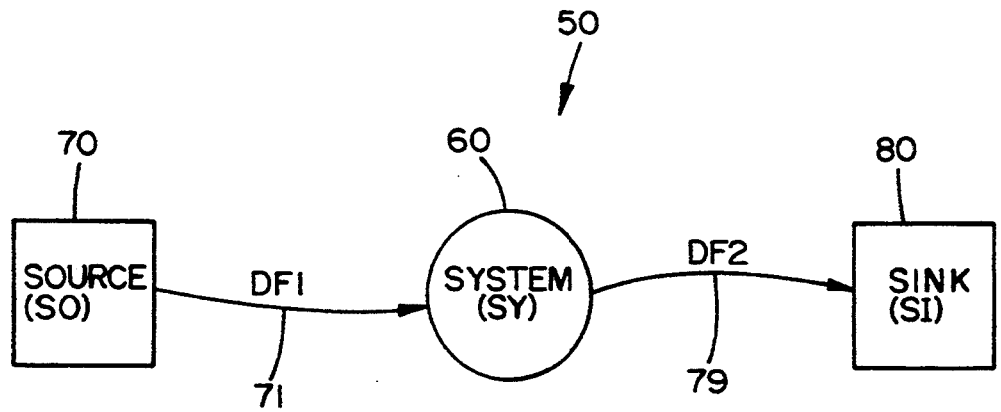
FIG. 2 is a structured analysis context diagram for a given system.

Referring now to FIG. 2, there is shown a typical structured analysis context diagram 50, which is one form of a data flow diagram. The system 60 to be designed, denoted SY, receives inputs from a source 70, denoted SO, and outputs data to a sink 80, denoted SI. Dataflow 1, DF1, represented by vector 71 and Dataflow 2, DF2, represented by vector 79 represent the data being transferred into and out of SY 60. The context diagram 50 follows the standard data flow diagram representation for the various elements; namely, processes and systems are represented by circles or bubbles, data sources and data sinks are represented by boxes, and data flows are represented by named vectors. The one additional element which is not shown in this figure is a data file which is represented by straight parallel lines or a single straight line. This context diagram 50 represents a simplistic system and the only difference between this system and the most complicated system is the number of sources and sinks that lead into and out of the system respectively. Although named SO and SI, the names of the actual source 70 and sink 80 will be distinguishable from one another by a convenient naming scheme. The context diagram 50 is drawn on a graphics terminal by the Cadre Teamwork tool which as stated previously is a standard structured analysis tool. After completion, the diagram is saved and stored by Teamwork in its internal files. These internal files are used by Teamwork when the context diagram 50 is recalled for purposes of modifying the diagram or just for viewing it. In a manner similar to the way in which Teamwork uses these internal files to reconstruct the context diagram, the MCP of FIG. 7 uses them to generate a standard METAfile.

Figure 3:
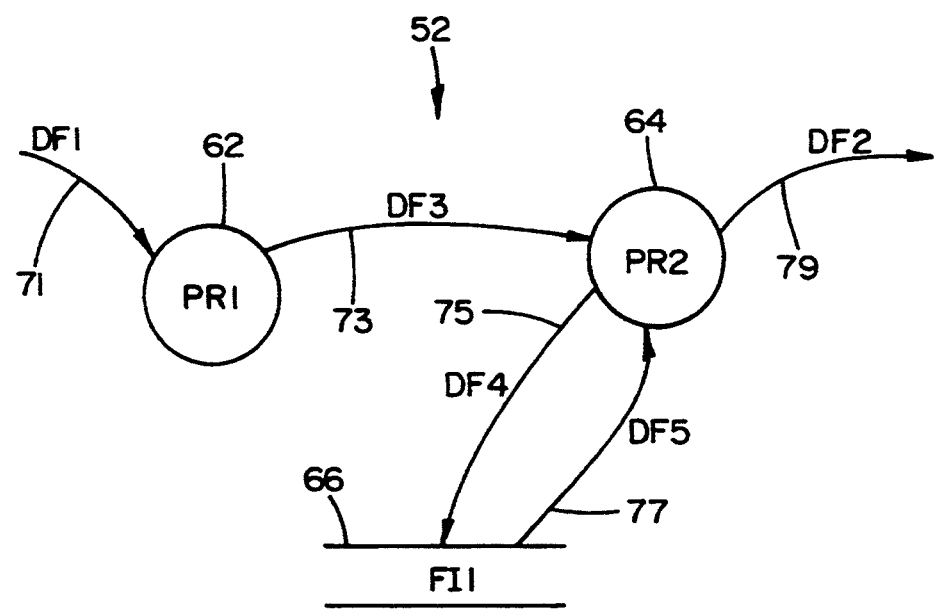
FIG. 3 is a structured analysis top-level data flow diagram for the given system of FIG. 2.

Referring to FIG. 3, there is shown a top-level data flow diagram 52 of the system, 60, represented by the context diagram of FIG. 2. Whereas the context diagram 50 depicts the domain or scope of the task, the top level data flow diagram 52 depicts the specific functions of which the system 60, in the context diagram 50 is comprised. As is shown in FIG. 3, the system 60 is comprised of two functions, process 1, PR1, and process 2, PR2, respectively. Utilizing the standard convention for data flow diagrams, PR1 is represented by a first bubble 62 and PR2 is represented by a second bubble 64. An internal file 66, or data base denoted FI1, is represented in the dataflow diagram by two parallel lines. DF1 71 is shown entering process 1 bubble 62 and DF2 79 is shown exiting process 2 bubble 64. The remaining dataflows, DF3 73, DF4 75 and DF5 77 are all internal to system 60 of FIG. 2. It is important to note that only the data flows input to the specific process being decomposed are depicted in the diagram.

The system user need not convert each and every data flow diagram prior to METAfile conversion. The system user is given the capability of generating a METAfile for any level of decomposition desired. As stated previously, in order to generate a METAfile, the MCP of FIG. 7 analyzes the internal Teamwork files and accesses those data base files required to rebuild the desired data flow diagrams. The MCP initiates conversion with the context diagram 50, or other specified data flow diagram. For each element that is contained in a data flow diagram, the MCP generates a series of records containing the name of the element and its various input and output data flows. Table 1 given below represents the METAfile for the context diagram 50 of FIG. 2, this METAfile is the output of the first step in the MCP conversion process. The element name, wherein an element may be a source, sink, process or file, is depicted followed by the data flows entering or exiting the element.

TABLE 1

| METAfile for Context Diagram |
|---|
| SO (SOURCE, DATA GENERATION TIME) |
| DF1 ("O", SY, DATA RATE, DATA SIZE) |
| SY (PROCESS, PROCESS TIME) |
| DF1 ("I", SO, DATA RATE, DATA SIZE) |
| DF2 ("O", SI, DATA RATE, DATA SIZE) |
| SI (SINK) |
| DF2 ("I", SY, DATA RATE) |

The basic parameter components for the conversion process are as follows:

element name x (block type, process time)

$DF_{in}$ ("I", element name y, data rate, data size)

$DF_{out}$ ("O", element name z, data rate, data size)

Element name x, represents the element for which all input and output dataflows are to be defined. The element can be a source, sink, process or file. The element name has certain parameters associated with it which defines the specific element. These parameters are the items listed between the parenthesis and are known as the parameter list. The block type specifies what the element represents, that is, whether it is a source, sink, process or file. The process time is the amount of time to perform the particular process specified. Sources and sinks will have zero times, whereas processes and file read/writes will usually have a variable time associated with their functions. Dataflow in, $DF_{in}$, represents a dataflow input to element name x. It is important to note that multiple dataflows may be input to a single element. The dataflow in has certain parameters associated with it which defines or set the parameters for the particular dataflow. The "I" parameter is a constant which indicates that the dataflow is an input dataflow. Element name y represents the element from which this particular dataflow originated. The data rate is the rate at which the data represented by the dataflow will be entering the particular elements. This rate may or may not be a constant, it depends on the source of the data. The data size is the type of data being transmitted and its actual size. Dataflow out, $DF_{out}$, represents a dataflow output from element name x. The dataflow out has certain parameters associated with it which defines or sets the parameters for the particular dataflow. The "O" parameter is a constant which indicates that the dataflow is an output dataflow. Element name z represents one of the elements to which this particular dataflow is targeted for. An output dataflow may be input to one or more elements. The data rate is the rate at which the data represented by the dataflow will be exiting the particular element. Once again this may or may not be a constant. The data size is the type of data being transmitted, and its actual size.

Therefore, referring to Table 1 and FIG. 2, it is seen that there is a one-to-one correspondence between the context diagram and the METAfile. The first line of the METAfile of Table 1 indicates that SO is a SOURCE block type and that the time to perform the particular process specified is given by DATA GENERATION TIME. The second line of the METAfile indicates that there is an output dataflow from SO and that it is targeted for SY. The output data format is specified in DATA RATE and DATA SIZE. The context diagram 50 of FIG. 2 shows that DF1 originates from SO 70 and ends up at SY 60. The third line of the METAfile indicates that SY is a PROCESS block type and that the time to perform the particular process specified is given by PROCESS TIME. The fourth line of the METAfile indicates that there is an input dataflow from SO, the rate at which the data represented by the dataflow will be entering SY is DATA RATE, and the size and type of data is DATA SIZE. The fifth line of the METAfile indicates that there is an output dataflow from SY and that it is targeted for SI. The context diagram 50 of FIG. 2 shows that SY 60 receives DF1 71 from SO 70 and outputs DF2 79 to SI 80. The sixth line of the METAfile indicates that SI is a SINK block type. The seventh and final line of the METAfile indicates that there is an input dataflow from SY, and the rate at which the data represented by DF2 will be entering SI is DATA RATE. The context diagram 50 of FIG. 2 shows that SI 80 receives DF2 79 from SY 60. The process time, data rate and data size parameters are not illustrated in the actual context diagram 50, but rather are supplied by various other structured analysis tools, such as mini-specifications and data dictionaries, which are fully explained in subsequent paragraphs.

Table 2 shown below represents the converted METAfile for the top level data flow diagram 52 given in FIG. 3.

TABLE 2

| METAfile for Top-Level DFD 0 | |
|---|---|
| PR1 | (PROCESS, PROCESS TIME) |
| DF1 | ("I", XXX, DATA RATE, DATA SIZE) |
| DF3 | ("O", PR2, DATA RATE, DATA SIZE) |
| FI1 | (FILE, FILE SIZE) |
| DF4 | ("I", PR2, DATA RATE, DATA SIZE) |
| DF5 | ("O", PR2, DATA RATE, DATA SIZE) |
| PR2 | (PROCESS, PROCESS TIME) |
| DF3 | ("I", SI, DATA RATE, DATA SIZE) |
| DF4 | ("O", FI, DATA RATE, DATA SIZE) |
| DF5 | ("I", FI, DATA RATE, DATA SIZE) |
| DF2 | ("O", XXX, DATA RATE, DATA SIZE) |

"XXX" indicates that the data flows are to be found on a higher-level dataflow diagram numbered XXX. The same one-to-one correspondence between the top-level data flow diagram of FIG. 3 exists with the METAfile of Table 2. Each element depicted in FIG. 3 has a corresponding section in the METAfile of Table 2. It is important to note that as each process is converted, the various mini-specifications are analyzed to ascertain if there are any special constructs in it.

A complete or final METAfile is the consolidation of all upper and lower level data flow diagrams to be included in the simulation into a single file. The number of levels or degree of decomposition depends upon the complexity of the system and the discretion of the system user. A child data flow diagram is the data flow diagram obtained by decomposing a single process contained in the previous higher level data flow diagram. For example, three processes in one data flow diagram will decompose into three lower level or children data flow diagrams. The Teamwork system relates the children to parent processes by adding 0.1 to the data flow identification number. Therefore, the child of process 3 would be numbered 3.1 and the child of 3.1 would be 3.1.1. The combination of all the children results in a final METAfile. Other elements however, may ultimately be included in the METAfile as new needs and capabilities develop.

Figure 4:
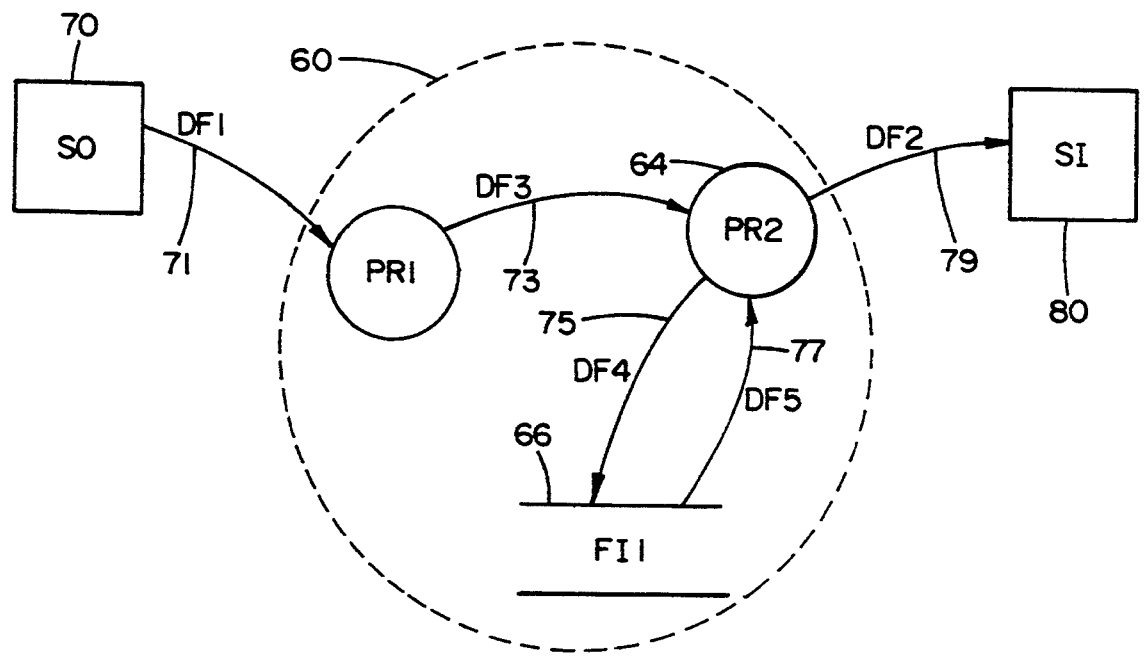
FIG. 4 is a structured analysis consolidated data flow diagram representing the consolidation of the context diagram and the top-level data flow diagram for the given system.

As an example of how to consolidate a child into a parent data flow diagram, the parent system of FIG. 2 is replaced with the complete child process, PR1 and PR2 of FIG. 3. The resulting consolidated data flow diagram is shown in FIG. 4. FIG. 4 depicts the newly consolidated data flow diagram 54 created by the replacement of system SY 60 with its child data flow diagram of FIG. 3. The two data flow diagrams are not merged physically, rather FIG. 4 is merely a logical representation of the merging process. Table 3, given below, depicts the merged METAfile output file of the consolidated data flow diagram 54. Once again there is a one-to-one correspondence between the data flow diagram 54 and the METAfile. Basically, the merged METAfile output file represents the substitution of SY 60 by its child data flow diagram and the modification of the data flow diagram parameters that refer to SY as either input or output.

TABLE 3

| Consolidated METAfile for Top-Level DFD | |
|---|---|
| SO | (SOURCE, DATA GENERATION TIME) |
| DF1 | ("O", PR1, DATA RATE, DATA SIZE) |
| PR1 | (PROCESS, PROCESS TIME) |
| DF1 | ("I", SO, DATA RATE, DATA SIZE) |
| DF3 | ("O", PR2, DATA RATE, DATA SIZE) |
| FI1 | (FILE, FILE SIZE) |
| DF4 | ("I", PR2, DATA RATE, DATA SIZE) |
| DF5 | ("O", PR2, DATA RATE, DATA SIZE) |
| PR2 | (PROCESS, PROCESS TIME) |
| DF3 | ("I", PR1, DATA RATE, DATA SIZE) |
| DF4 | ("O", FI1, DATA RATE, DATA SIZE) |
| DF5 | ("I", FI1, DATA RATE, DATA SIZE) |
| DF2 | ("O", SI, DATA RATE, DATA SIZE) |
| SI | (SINK) |
| DF2 | ("I", PR1, DATA RATE) |

Figure 5:
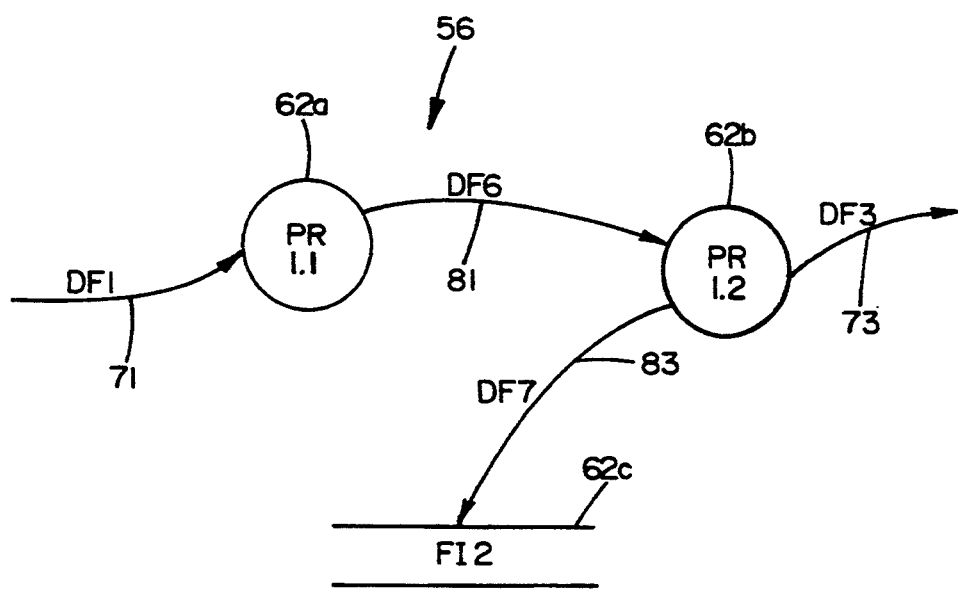
FIG. 5 is a structured analysis child data flow diagram of process PR1 in the top-level data flow diagram for the given system.
Figure 6:
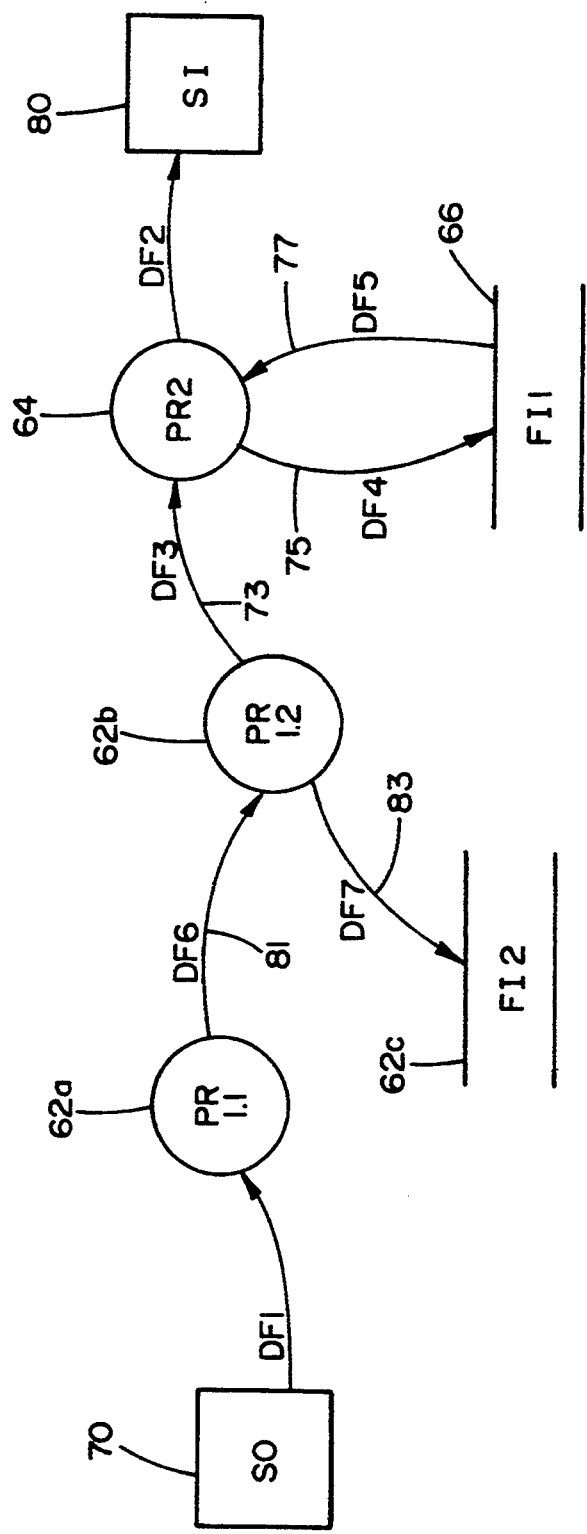
FIG. 6 is a structured analysis consolidated data flow diagram representing the consolidated diagram of FIG. 4 and the child data flow diagram of FIG. 5.

A further example of the decomposition process is the replacement of process PR1 62 in the data flow diagram 52 shown in FIG. 3 with it its child data flow diagram, DFD PR1. FIG. 5 represents the child data flow diagram 56 of process PR1 62 in the top-level data flow diagram 52 of FIG. 3. It is numbered according to the aforementioned standard as DFD 1.1 since the top-level data flow diagram is DFD 1. As is shown in FIG. 5, PR1 62 of FIG. 3 is shown to comprise PR1.1 62a, PR1.2 62b and FI2 62c with dataflows DF6 81 and DF7 83 internally connecting the elements. FIG. 6 represents the logically merged data flow diagrams, while Table 4, given below, contains the converted METAfile for the merged data flow diagrams.

TABLE 4

Consolidated METAfile for PR1-Level DFD

| | |
|---|---|
| SO | (SOURCE, DATA GENERATION TIME) |
| DF1 | ("O", PR1.1, DATA RATE, DATA SIZE) |
| PR1.1 | (PROCESS, PROCESS TIME) |
| DF1 | ("I", SO, DATA RATE, DATA SIZE) |
| DF6 | ("O", PR1.2, DATA RATE, DATA SIZE) |
| PR1.2 | (PROCESS, PROCESS TIME) |
| DF6 | ("I", PR1.1, DATA RATE, DATA SIZE) |
| DF7 | ("O", FI2, DATA RATE, DATA SIZE) |
| DF3 | ("O", PR2, DATA RATE, DATA SIZE) |
| FI2 | ("FILE", FILE SIZE) |
| DF7 | ("I", PR1.2, DATA RATE, DATA SIZE) |
| PR2 | (PROCESS, PROCESS TIME) |
| DF3 | ("I", PR1.2, DATA RATE, DATA SIZE) |
| DF4 | ("O", FI1, DATA RATE, DATA SIZE) |
| DF5 | ("I", FI1, DATA RATE, DATA SIZE) |
| DF2 | ("O", SI, DATA RATE, DATA SIZE) |
| FI1 | (FILE, FILE SIZE) |
| DF4 | ("I", PR2, DATA RATE, DATA SIZE) |
| DF5 | ("O", PR2, DATA RATE, DATA SIZE) |
| SI | (SINK) |
| DF2 | ("I", PR2, DATA RATE) |

Typically, additional information is required to be included in the METAfile prior to building a completed and fully operational simulation model. This information has been briefly discussed in the aforementioned discussion of the METAfile data parameters and is now discussed in detail.

Figure 7:
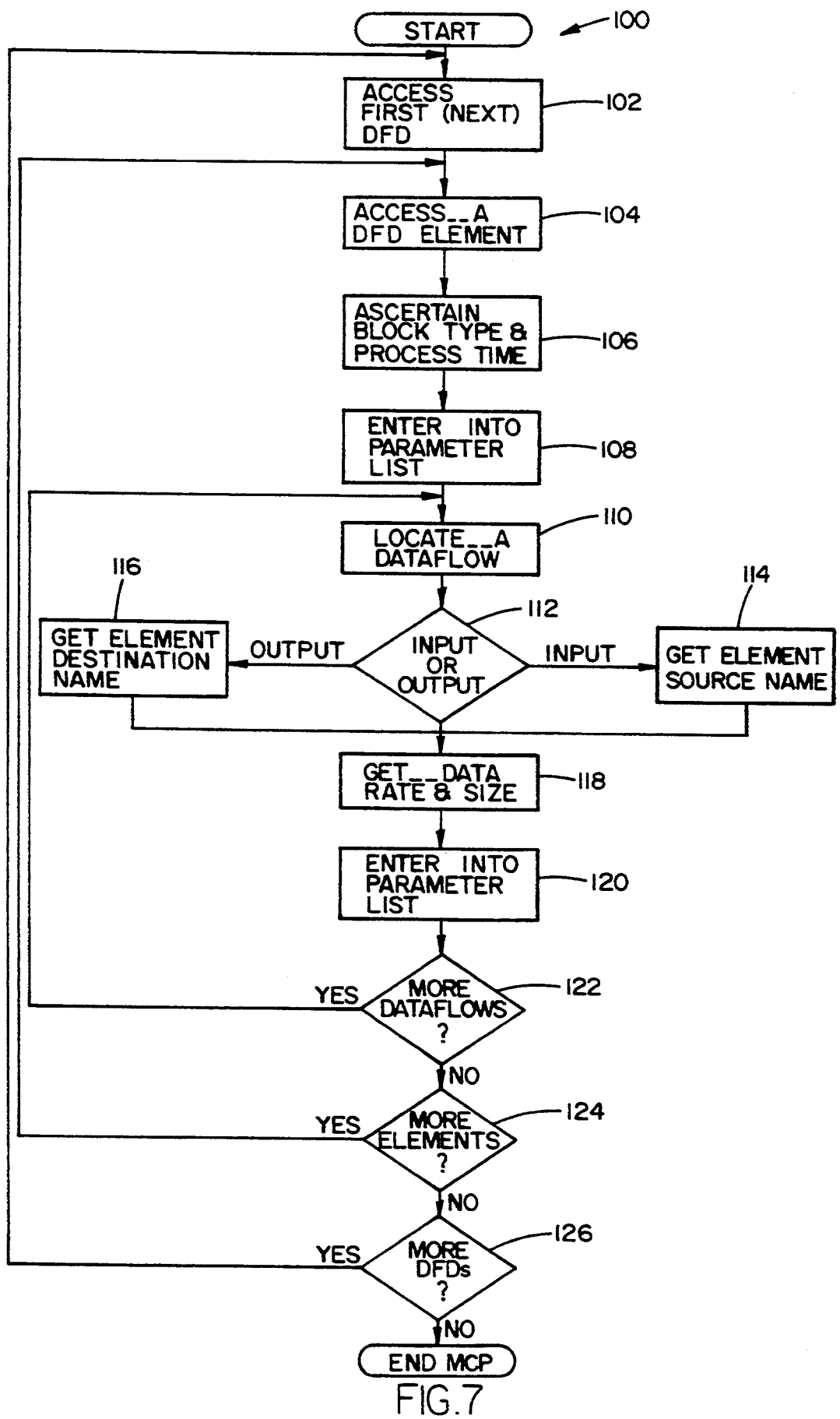
FIG. 7 is a flow chart representation of the METAfile Conversion Program of the present invention.

As each source, sink, process and file are converted by the MCP of FIG. 7, the respective block type is inserted in the element name parameter list. The block type is necessary to enable the SGP of FIG. 10 to distinguish between element types so that it may generate the unique simulation blocks and code required to represent the structured analysis model. In the GPSS Simulation System for example, these would be Generate, Terminate and Advance blocks among other simulation blocks and code deemed necessary.

The amount of processing time required for each function or process to complete its task will vary depending upon the particular input. The processing time will be contained in the process-specification or mini-specification associated with each lowest level or primitive process. For higher level data flow diagrams, the estimated processing time will be contained on a note-specification. The note-specification is a small textual file containing general comments about the system. When searching for the time parameter, the system will always search for the time associated with the lowest level process in the data flow diagrams to be simulated. The value of time is inserted into the processing time parameter in element name x. This parameter will include any random variables associated with the time variable.

The data rate of the dataflow input to each process is required and is the processing trigger of the respective process to which it is input. That is, if the data is input to a process ten times a second, then the time to process the input in one second is equal to ten times the processing time per transaction, plus or minus the variable time which varies for each transaction. The time for processing a consolidated data flow diagram then is the sum of the total processing times for all processes in the consolidated data flow diagram. This time is then compared to the total processing time available, based upon the chosen hardware, for the period being simulated. If the function processing time is greater than that for which the selected processor is capable of processing, then the System Engineer must consider the use of more powerful processors, or a system redesign. The length of the different types of data and messages are required to be known in order to compute the size of RAM and other on-line storage capacities that are in the system.

The length of all data and data elements are obtained from the data dictionary. Although accurate data sizes can not be determined, in most cases, until the lowest level of data decomposition has been defined in the data dictionary, good estimates may be made at higher levels of abstraction. The value for the data flow length will be included in the data size parameter of DFx.

FIG. 7 provides a flow chart of the generic MCP 100 utilized to generate the aforementioned METAfiles. The Access First DFD block 102 represents the block of software that is responsible for searching through the CADRE Teamwork data base, or any other structured analysis tool's data base, for information on a particular data flow diagram. The Access A DFD Element block 104 represents the block of software that is responsible for locating the first element in a particular data flow diagram. Recall that an element can be source, sink, process or file. The Ascertain Block Type And Process Time block 106 represents the block of software that is responsible for determining what each element discussed above represents, that is, whether the element is a source, sink, process or file. The Enter Into Parameter List block 108 represents the block of software that is responsible for placing the block type and process time, as determined above, into the parameter list that follows the element name or dataflow name as indicated in the previously described METAfiles. The Locate A Dataflow block 110 represents the block of software that is responsible for finding the dataflows, either input or output, to the element. The Input Or Output decision block 112 represents the block of software that is responsible for determining whether a particular dataflow is an input or output dataflow. If it is an input dataflow, the Get Element Source Name block 114 is executed. The Get Element Source Name block 114 represents the block of software responsible for determining the name of the particular element from which the data is transmitted. If it is an output dataflow, the Get Element Destination Name block 116 is executed. The Get Element Destination Name block 116 represents the block of software responsible for determining the name of the particular element to which the data is to be transmitted. The Get Data Rate And Size block 118 represents the block of software that is responsible for determining the data rate and the size of the data associated with either an input dataflow or an output dataflow. The Enter Into Parameter List block 120 represents the block of software that is responsible for placing the data rate and size, as determined above, into the parameter list that follows the dataflow designation as indicated in the previously described METAfiles. The More Dataflows decision block 122 represents the block of software that is responsible for determining whether there are any more dataflows that should go into the composite METAfile for that element. If there are more data flows, the YES path will be followed and the next block of code to be executed is the Locate A Dataflow block 110. If there are no more data flows, the NO path will be followed which leads to the More Elements decision block 124. The More Elements decision block 124 represents the block of software that is responsible for determining whether there are more data flow diagram elements in a particular data flow diagram. If there are more elements the YES path will be followed and the next block of code to be executed will be the Access A DFD Element block 104. If there are no more data flow diagram elements, the NO path will be followed which leads to the More DFD's decision block 126. The More DFD's decision block 126 represents the block of software that is responsible for determining whether there are any more data flow diagrams to process before completing MCP processing. If there are more data flow diagrams the YES path will be followed and the next block of code to be executed will be the Access First DFD block 102. If there are no more data flow diagrams, then the NO path will be followed and the processing will end.

It is important to note, that as stated before, not all of the needed simulation information comes directly from the data base used to construct the data flow diagrams.

Figure 8:
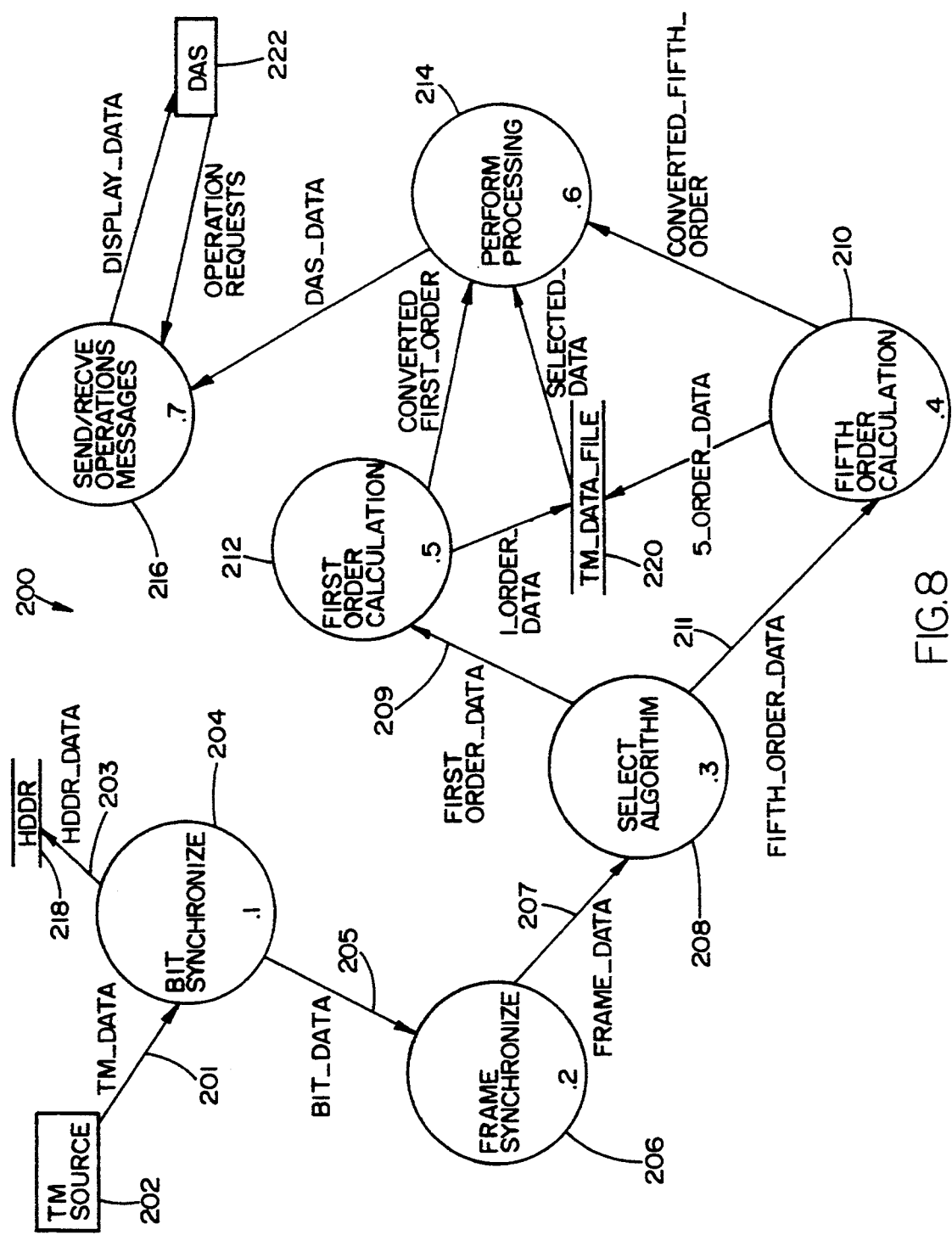
FIG. 8 is a data flow diagram for a telemetry system.

Language, GPSS, will be utilized to describe how the conversion from METAfile to simulation model is to be performed. Referring now to FIG. 8, there is shown a top level data flow diagram 200 representing a simple telemetry system. The data flow diagram 200 is comprised of a total of eleven elements, namely, one source 202 denoted TM_SOURCE, seven processes BIT_SYNCHRONIZ 204, FRAME_SYNCHRONIZ 206 SELECT_ALGORITHM 208, FIFTH_ORDER_CALCULATION 210, FIRST_ORDER_CALCULATION 212, PERFORM_PROCESSING 214, and SEND_RECVE_OPERATIONS_MESSAGES 216 two files HDDR 218 and TM_DATA_FILE 220 and one sink 222, denoted DAS. Table 5, shown below, contains the converted METAfile for this example, the METAfile was created utilizing the process described above.

TABLE 5

| METAfile for Telemetry Example |
| --- |
| TM_SOURCE( "SOURCE", DATA GENERATION RATE) |
| TM_DATA ( "O", BIT-SYNCHRONIZ) |
| BIT_SYNCHRONIZ ("SPLIT", PROCESS TIME) |
| TM_DATA ("I", TM_SOURCE, DATA RATE/SIZE) |
| HDDR_DATA ("O", HDDR, DATA RATE/SIZE) |
| BIT_DATA ("O", FRAME_SYNCHRONIZ, DATA RATE/SIZE) |
| HDDR ("FILE", FILE SIZE, FILE TYPE) |
| HDDR_DATA ("I", BIT_SYNCHRONIZ, DATA RATE/SIZE) |
| FRAME_SYNCHRONIZ ("PROCESS", PROCESS TIME) |
| BIT_DATA ("I", BIT_SYNCHRONIZ, DATA RATE/SIZE) |
| FRAME_DATA ("O", SELECT_ALGORITHM, DATA RATE/SIZE) |
| SELECT_ALGORITHM ("LOGIC", PROCESS TIME) |
| FRAME_DATA ("I", FRAME_SYNCHRONIZ, DATA RATE/SIZE) |
| FIRST_ORDER_DATA ("O", FIRST_ORDER_CALCULATION, DATA RATE/SIZE) |
| FIFTH_ORDER_DATA ("O", FIRST_ORDER_CALCULATION, DATA RATE/SIZE) |
| FIRST_ORDER_CALCULATION ("SPLIT", PROCESS TIME) |
| FIRST_ORDER_DATA ("I", SELECT_ALGORITHM, DATA RATE/SIZE) |
| 1_ORDER_DATA ("O", TM_DATA_FILE, DATA RATE/SIZE) |
| CONVERTED_FIRST_ORDER ("O", PERFORM_PROCESSING, DATA RATE/SIZE) |
| FIFTH_ORDER CALCULATION ("SPLIT", PROCESS TIME) |
| FIFTH_ORDER_DATA ("I", SELECT_ALGORITHM, DATA RATE/SIZE) |
| 5_ORDER_DATA ("O", TM_DATA_FILE, DATA RATE/SIZE) |
| CONVERTED_FIFTH_ORDER "O", PERFORM_PROCESSING, DATA RATE/SIZE) |
| TM_DATA_FILE ("FILE", FILE SIZE, FILE TYPE) |
| 1_ORDER_DATA ("I", FIRST_ORDER_CALCULATION, DATA RATE/SIZE) |
| 5_ORDER_DATA ("I", FIFTH_ORDER_CALCULATION, DATA RATE/SIZE) |
| SELECTED_DATA ("O", PERFORM_PROCESSING, DATA RATE/SIZE) |
| PERFORM_PROCESSING ("PROCESS", PROCESS TIME) |
| CONVERTED_FIRST_ORDER ("I", FIRST_ORDER_CALCULATION, DATA RATE/SIZE) |
| CONVERTED_FIFTH_ORDER ("I", FIFTH_ORDER_CALCULATION, DATA RATE/SIZE) |
| SELECTED_DATA ("I", TM_DATA_FILE, DATA RATE/SIZE) |
| DAS_DATA ("O", SEND/RECVE_OPERATIONS_MESSAGES, DATA RATE/SIZE) |
| SEND/RCVE_OPERATIONS_MESSAGES ("PROCESS", PROCESS TIME) |
| DAS_DATA ("I", PERFORM_PROCESSING, DATA RATE/SIZE) |
| OPERATION_REQUESTS ("I", DAS, DATA RATE/SIZE) |
| DISPLAY_DATA ("O", DAS, DATA RATE/SIZE) |
| DAS ("SINK") |
| DISPLAY_DATA ("I", SEND/RECVE_OPERATIONS_MESSAGES, DATA RATE/SIZE) |
| OPERATION_REQUESTS ("O", SEND/RECVE_OPERATIONS_MESSAGES, DATA RATE/SIZE) |

Additional information is provided by the various other tools; namely, data dictionaries and mini-specifications. It is also possible that there is one central data base and all information may be obtained therefrom. These different possibilities are the reasons why a different MCP 100 must be utilized for each structured analysis tool.

Figure 9:
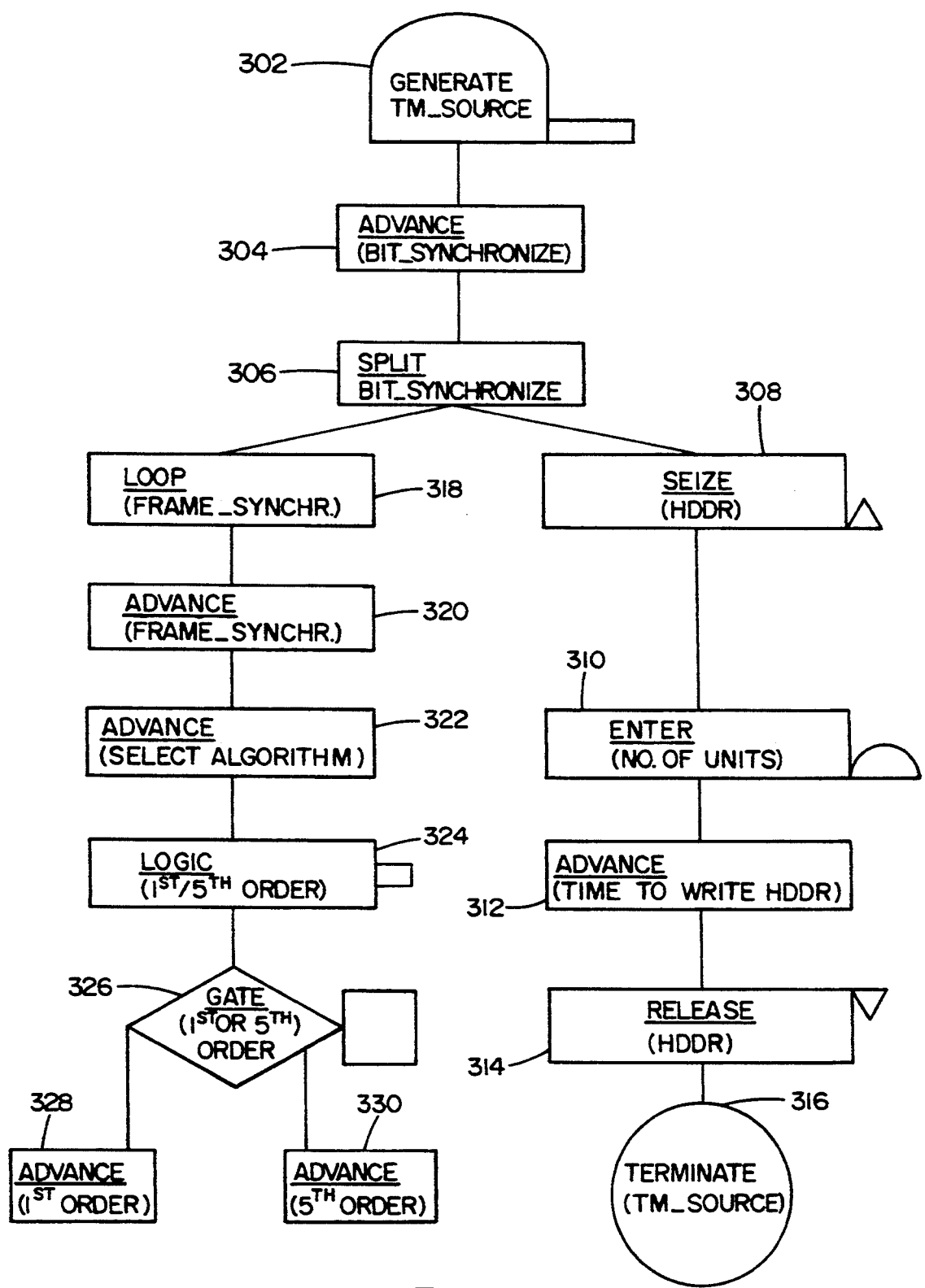
FIG. 9 is a GPSS Simulation Model for the telemetry system of FIG. 8.

After completing the METAfile conversion, which is the first step in the overall conversion process, the next step in the process is to convert the completed METAfile, which is output from the MCP 100, into the selected simulation source language. The simulation program(s) that will execute the simulation source language model are existing systems that have been in use for many years. For purposes of describing this portion of the process, the IBM General Purpose Simulation The first step in the simulation conversion process is the analysis of the first element in the METAfile; namely, TM_SOURCE which also corresponds to box 202 in FIG. 8. The block type in the parameter list indicates that TM_SOURCE is a SOURCE input block. SOURCE blocks in the METAfile are converted to GPSS GENERATE blocks, and as indicated in FIG. 9, TM_SOURCE is replaced with a GPSS GENERATE block 302. FIG. 9 is a GPSS Simulation Model for the Telemetry system depicted in FIG. 8. The processing time parameter, DATA GENERATION RATE in the parameter list, is analyzed for the input data frequency, which is associated with the GENERATE block. This information represents all required information for the GENERATE block. Please note that the GPSS model depicted in FIG. 9 is not intended to be a 100 percent true representation of a GPSS model, but only a simplified version for purposes of explanation.

Immediately following the TM_SOURCE element description in the METAfile is the dataflow TM_DATA, indicated by vector 201 in FIG. 8. The first parameter field is checked in TM_DATA and as indicated, it is determined to be an "O" which defines this as a TM_SOURCE outgoing dataflow. In the simulation model, this becomes an output from TM_SOURCE. The SGP 400 shown in FIG. 10 then scans the METAfile to locate a matching TM_SOURCE input dataflow that originates from the TM_SOURCE element 202. The matching input is located under the element name BIT_SYNCHRONIZ which is represented by bubble 204 in FIG. 8 and the second group in the METAfile of Table 5. The block type in the parameter list indicates that BIT_SYNCHRONIZ 204 is a SPLIT block. The SPLIT block type is always converted to GPSS ADVANCE and SPLIT blocks. The SPLIT block for BIT_SYNCHRONIZ 204 is replaced with GPSS ADVANCE block 304 and SPLIT block 306, as is shown in FIG. 9. A SPLIT block takes a finite amount of time to execute and this time is specified in the ADVANCE block 304 as shown in FIG. 9. This time is extracted from the PROCESSING TIME parameter in the element parameter list of the METAfile. In the data flow diagram of FIG. 8, it should be noted that there are two dataflows, HDDR_DATA and BIT_DATA represented by vectors 203 and 205 respectively, exiting the BIT_SYNCHRONIZ process bubble 202. Multiple data flows concurrently exiting the same process are handled by the SPLIT block 306 as shown in FIG. 9. The SPLIT block 306 is merely a device to split outgoing dataflows. Each dataflow will cause the creation of a separate simulation path as indicated in FIG. 9.

Following the HDDR_DATA dataflow, vector 203, leads to the HDDR element 218, represented by parallel lines in FIG. 8 and the third group in the METAfile. The block type in the parameter list indicates that HDDR 218 is a FILE type block. In GPSS, a file is defined as a facility. In order to access a facility, five things must occur. First, the system user must "seize" the particular facility, such as a disk 5 drive, thereby locking out other users. This is depicted in the GPSS model of FIG. 9 by the SEIZE block 308. The specific facility seized would be indicated in the block. Second, after seizing the specific facility, the dataflows are analyzed. HDDR_DATA 203 contains an "I" in the first field of the parameter list and is therefore a facility input dataflow originating from the BIT_SYNCHRONIZ element 204. The data record size to be written to the file is deducted from the available facility space. The size of the data record is obtained from the facility input dataflow data size parameter. This is depicted in the model of FIG. 9 by the ENTER block 310. Third, every read/write to/from a file requires some finite amount of time. This time is simulated by the use of the ADVANCE block 312 shown in FIG. 9, whose sole purpose is to simulate processing time. Fourth, after the record has been written, the facility is released by the RELEASE block 314. Fifth, since this path of the simulation ends with the writing to the HDDR file 218, the path is terminated with the TERMINATE block 316.

At this point, the first three elements in the METAfile have been converted to GPSS Simulation Language.

The conversion process continues by passing to the next element in the METAfile requiring conversion. This is the FRAME_SYNCHRONIZ element, which is represented by bubble 206 in FIG. 8. In the model, this is the second path out of the SPLIT block 306. The SGP 400 of FIG. 10 knows this is the second path out of the SPLIT block 306 since the dataflow, BIT_DATA 205, is the second of the two output dataflows from the BIT_SYNCHRONIZ element 204 that were split previously. The block type in the parameter list indicates that FRAME_SYNCHRONIZ 206 is a process. The process is analyzed, and the element block type is determined to be a LOOP block 318. The LOOP block 318, and the immediately following ADVANCE block 320 are utilized to replace repetitive processes that must be executed a number of times until a predefined condition has been met. The model does not have the specific condition programmed into it, but rather, it has associated with it a distribution that randomly selects the number of times the looping procedure is to take place. The METAfile had earlier determined this is a looping block by retrieving that information from either the structured analysis process-specification or mini-specification. The distribution would also be obtained from those sources at that time. The ADVANCE block 320 following the LOOP block 318 specifies the amount of time one traversal of the Loop would be expected to take.

Figure 10:
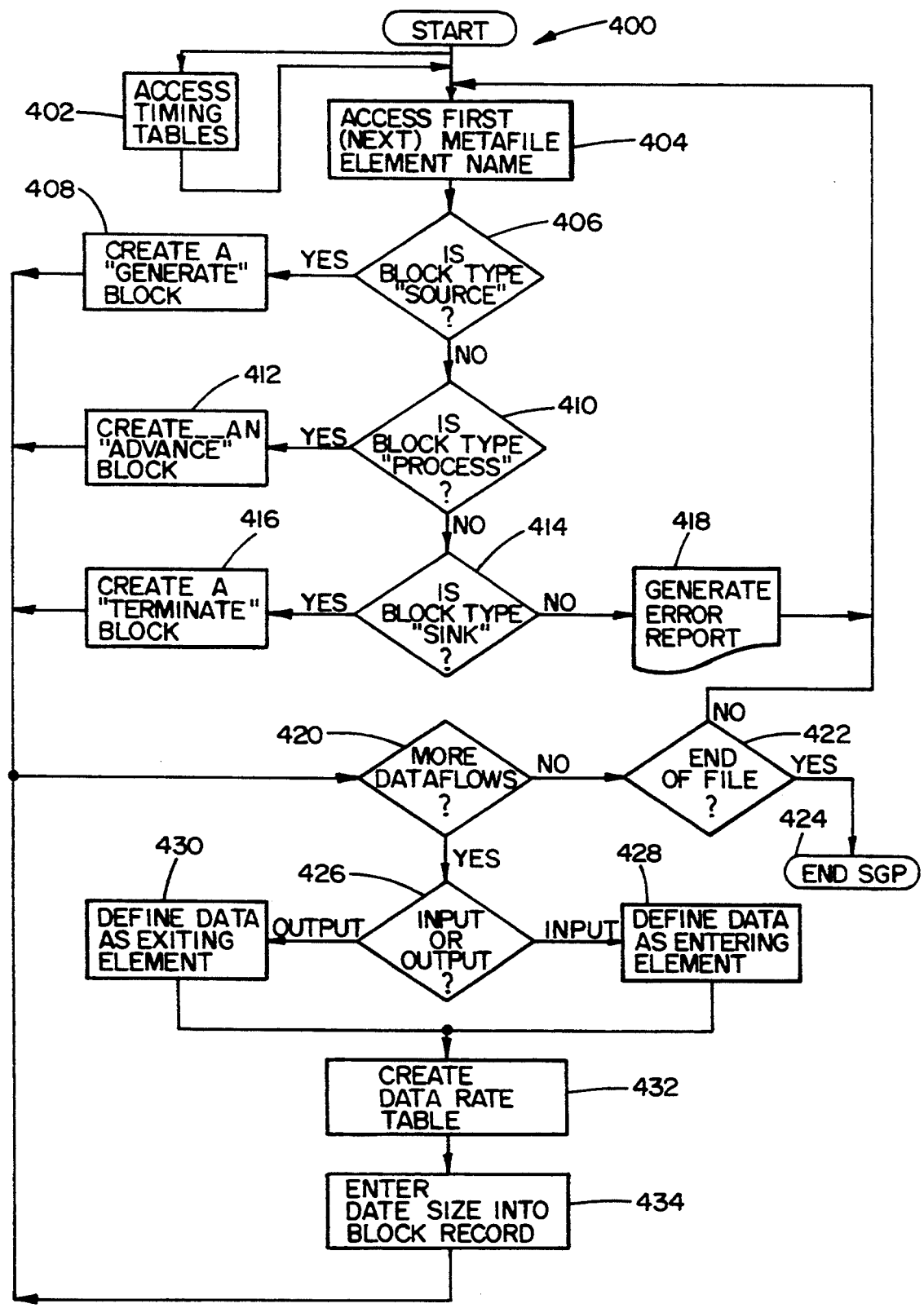
FIG. 10 is a flow chart representation of the Simulation Generation Program of the present invention.

The FRAME_DATA dataflow, represented by vector 207 in FIG. 8, is examined by the SGP 400 of FIG. 10 next, and it is determined to be an element output dataflow to the SELECT_ALGORITHM element represented by bubble 208. The block type in the parameter list indicates that the SELECT_ALGORITHM element 208 is a LOGIC block 326. The LOGIC type of block is simulated with a ADVANCE block 322. The time of delay is obtained from the process time parameter in the element name parameter list of the METAfile. Two output dataflows, FIRST_ORDER_DATA and FIFTH_ORDER_DATA, represented by vectors 209 and 211 respectively in FIG. 8, are shown exiting the SELECT_ALGORITHM bubble 208. As in the BIT_SYNCHRONIZ block 204, multiple dataflows exit this particular block 208. The difference between the MCP 100 choice of a LOGIC block type as opposed to a SPLIT block type, which also has multiple dataflows exiting it, is that a SPLIT block is selected when dataflows exit the element simultaneously, whereas a LOGIC block is selected when only one of the specified output dataflows can exit the particular element at any one time.

Two simulation blocks are required to simulate which of the two paths the data may take, a GPSS LOGIC block 326 and a GPSS GATE block 328. The LOGIC block 326 is used to represent logical and physical states. Each logical state has two logical attributes; namely, set and reset. The GATE block 328 controls the flow of transactions based on the true or false condition of the logical attributes. For example, if the condition is set in the model that 80 percent of the time the output dataflow is FIRST_ORDER_DATA, and 20 percent of the time it is FIFTH_ORDER_DATA, then the GPSS LOGIC block 326 will be set true 80 percent of the time. When the GATE block 328 sets the logical attributes, then it will find it is true 80 percent of the time, and will accordingly pass the data to the first order ADVANCE block 330 80 percent of the time.

The remaining 20 percent of the time the data will be passed to the fifth order GPSS ADVANCE block 332.

The remainder of the METAfile would be analyzed in a manner similar to that described above. Alternate conversion procedures may be invoked, depending upon the conditions to be simulated. All conditions not specified could be handled by coding the parameters into the element or dataflow parameter lists.

The converted Simulation Language code in the above telemetry example is depicted in graphical form as shown in FIG. 9, which is the standard method used to generate a GPSS model. Table 6 given below, however, contains the textual equivalent of the graphical model of FIG. 9. In the actual model, numbered values would replace the letters A through N.

TABLE 6

| | TELEMETRY EXAMPLE MODEL | | |
|---|---|---|---|
| | GENERATE | A,B | Transactions arrive every A ± B units |
| | ADVANCE | C,D | C is the time to do bit-synchronization ± D units |
| | SPLIT | HDDR1 | Splits the incoming transaction and sends one part of it to HDDR1 for processing |
| LOOP1 | LOOP | E,LOOP1 | E is the number of times the frame synchronization word must be bit-shifted prior to synchronization. LOOP1 is the block to go to if the number of loops requested has not been completed. |
| | ADVANCE | F,G | F is the time to do one loop, ± G units. |
| | ADVANCE | H | H is the time to select the algorithm. It is constant. |
| | LOGIC | I | Sets a condition, I, ($1^{st}$ or $5^{th}$ order equation) that can be tested for. |
| | GATE | I, FIFTH | Tests logic switch I. If true, the program goes to FIRST, else it goes to to FIFTH (not shown) |
| FIRST | ADVANCE | J,K | J is the time to perform a $1^{st}$ order equation calculation, ± K units. |
| . | . | . | ... |
| . | . | . | ... |
| . | . | . | ... |
| HDDR1 | SEIZE | HDDR | Allows the incoming transaction to obtain control of the specified facility, HDDR. |
| | ENTER | HDDR,L | Specifies that a record L units in length is to be written to HDDR. |
| | ADVANCE | M,N | M is the time to write the HDDR tape ± N units. |
| | RELEASE | HDDR | Releases the HDDR facility |
| | TERMINATE | | Represents the completion of a transaction's path |

FIG. 10 provides a flow chart of the SGP 400 utilized to generate the above simulation model and code. The ACCESS TIMING TABLES block 402 represents a block of software, arranged in tabular form, that contains both hardware and software processing times. A complete description of this table is given below. The Access First METAfile Element Name block 404 represents the block of software that is responsible for searching through the given METAfile and locating the first element therein. The Is Block Type "SOURCE" decision block 406 represents the block of software that is responsible for determining whether a particular element in the METAfile is a SOURCE type block. If the element is a SOURCE block type, then the YES path is followed to the Create A GENERATE Block block 408. The Create A GENERATE Block block 408 represents the block of software responsible for creating the Simulation Language for a GPSS GENERATE block. If the element is not a SOURCE block type, then the NO path is followed to the Is Block Type "PROCESS" decision block 410. The Is Block Type "PROCESS" decision block 410 represents the block of software that is responsible for determining whether a particular element in the METAfile is a PROCESS type block. If the element is a PROCESS block type, then the YES path is followed to the Create An ADVANCE Block block 412. The Create An ADVANCE Block block 412 represents the block of software responsible for creating the Simulation Language for a ADVANCE block. If the element is not a PROCESS block type, then the NO path is followed. The NO path leads through an identical set of decision blocks and create blocks as described above for all the various types of GPSS blocks in existence. The final decision block in the path is the Is Block Type "SINK" decision block 414, which is the block of software responsible for determining whether a particular element in the METAfile is a SINK type block. If the element is a SINK block type, then the YES path is followed to the Create A TERMINATE Block block 416. The Create A TERMINATE Block block 416 represents the block of software responsible for creating the Simulation Language for a TERMINATE block. If the element is not a SINK block type, then the NO path is followed to the Generate Error Report block 418. The Generate Error Report block 418 represents the block of software responsible for creating an error report indicating that there is an invalid block type present and returns the computer to the Access First METAfile Element Name block 404. This condition should not ordinarily occur; however, if it did it would be resolved manually by the designer. The output path of the Create A TERMINATE Block block 416 leads to the More Dataflows decision block 420. The More Dataflows decision block 420 represents the block of software responsible for determining if there are more dataflows. If there are none, the NO path is followed to the End of File decision block 422. The End of File decision block 422 simply determines if the end of a particular file has been reached. If it has not been reached then the NO path is followed to the Access First METAfile Element Name block 404. If the end of a particular file has been reached, then the YES path is followed to the End SGP block 424. If there are more dataflows, then the YES path is followed to the Input or Output decision block 426. The Input or Output decision block 426 is the block of software responsible for determining whether the particular dataflow is an input or output dataflow. If it is an input dataflow, then the next block of software executed is the Define Data As Entering Element block 428, and if the dataflow is an output dataflow, then the next block of software executed is the Define Data As Exiting Element block 430. Each of these blocks of software 428 and 430 represent the blocks of software responsible for defining the data in terms of from or where the data is going. The output of both these blocks both lead to the Create Data Rate Table block 432. The Create Data Rate Table block 432 is the block of software responsible for generating a table of data rates from the data contained in the parameter lists of the particular METAfile. The output of the Create Date Rate Table block 432 leads to the Enter Data Size Into Block Record block 434. The Enter Data Size Into Block Record block 434 is the block of software responsible for determining the space required for the storage of a particular data record. The output of this block leads back to the More Dataflows decision block 420.

The ACCESS TIMING TABLES block 402 shown in FIG. 10 provides for the accurate calculation of process timings as compared to the standard simulation method for estimating them. The standard simulation method utilizes estimated transaction processing times to derive an input distribution of expected processing times for each process. Through the use of ACCESS TIMING TABLES block 402, precise processing times are calculated by utilization of a hardware cycle and access time table, in conjunction with the specific programming language execution time table. The computer hardware processing times have to be created only once, and then may be utilized by any simulation model created. The software execution time table is also created only once and then may be utilized by any simulation model created. The individual software statement processing times are calculated from this table.

The final step of the process is the procedure for replacing components of the simulation model, as created above, with actual object code, software modules, in small incremental steps. As a consequence, at the end of integration, major portions of the actual system will have been tested. It may be possible to integrate some hardware components and subsystems into the model, where timing considerations do not present a problem.

Figure 11:
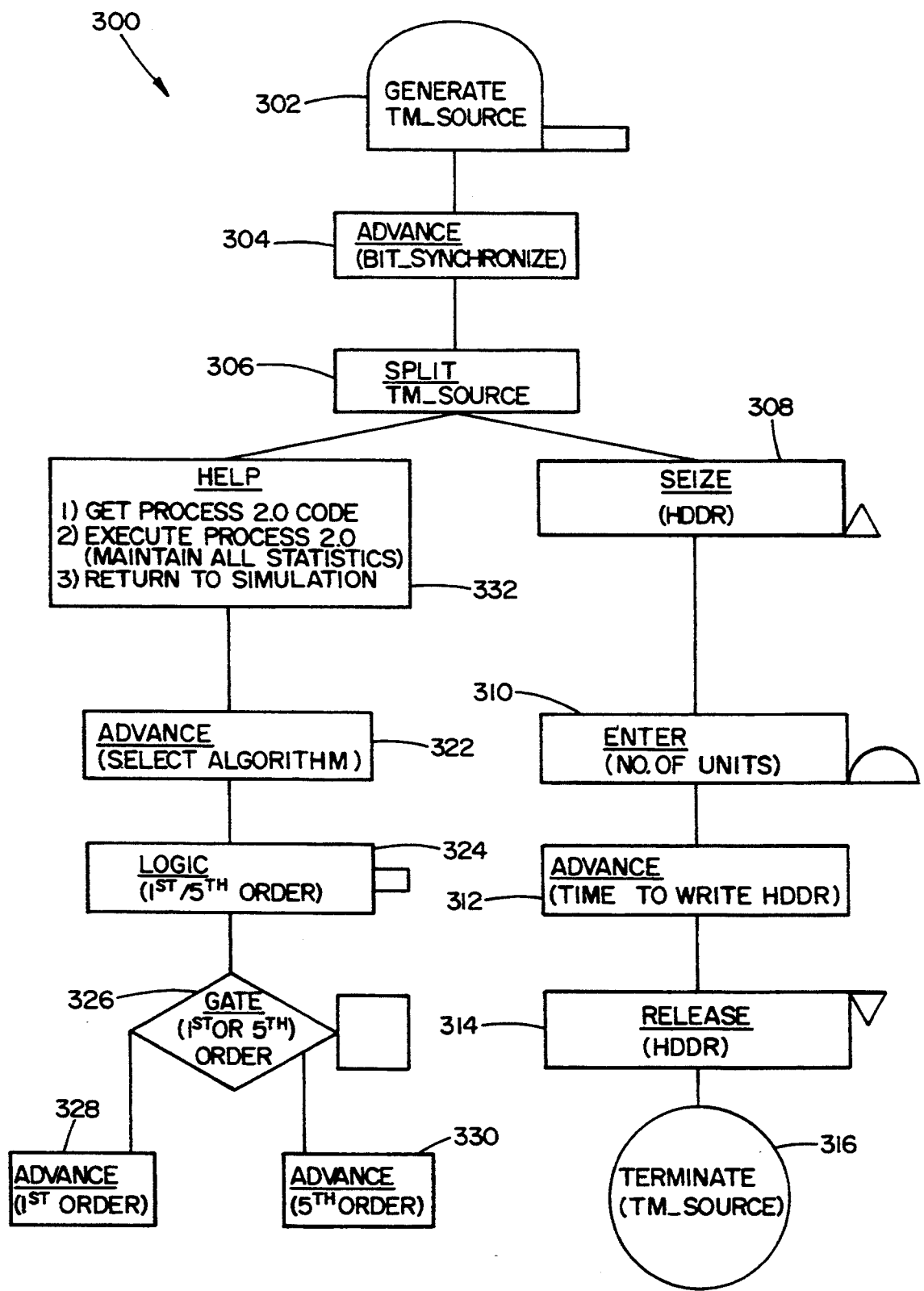
FIG. 11 is a GPSS Simulation Model for the telemetry system of FIG. 8 integrating object code for a given model block.

FIG. 11 is an updated version of FIG. 9, except that it depicts the means by which object code is integrated into the simulation model. In the example given above, the FRAME_SYNCHRONIZ bubble 206 of FIG. 8 which is represented by GPSS LOOP block 316 and ADVANCE block 320 in FIG. 9 is replaced by a HELP block 332. The HELP block 332 enables the system user to incorporate independently written assembly language or higher level language routines into the simulation runs. When the HELP block 332 is encountered, the simulation model executes the module specified as one of the parameters in the HELP block 332. First, the module specified in the HELP block 332 is accessed. Second, the module is executed. Third, the code returns control back to the simulation module. Since actual modules will require actual data for proper execution, it will be necessary to create that data prior to execution, and to make that data accessible to the executing modules(s). The output of a module could be saved and later used as input to a following module.

Basically, the HELP block 332 is a GPSS block which when executed calls an independently written block of software resident on the host computer, executes this block of software and upon completion returns to the simulation. In this embodiment, the HELP block 332 calls the PROCESS 2.0 software routine which should be resident on the host computer. The PROCESS 2.0 software could be written in any number of programming languages such as FORTRAN or ADA. The next step outlined in the HELP block 332 after the step of fetching or accessing the PROCESS 2.0 software is to execute this particular software routine or block of code. As is stated in the previous paragraph, all data necessary for the execution of the software routine should be made available prior to the execution of the software routine. Upon completion of execution of PROCESS 2.0, control of the computer should be passed back to the simulation, which in this example would be the ADVANCE block 322.

While the invention has been particularly shown and described with respect to the preferred embodiments thereof, it should be understood by those skilled in the art that the foregoing and other changes in form and details may be made therein without departing from the spirit and scope of the invention which should be limited only by the scope of the appended claims.

What is claimed is:

1. A method utilizing a computer means for automatically converting structured analysis tool outputs from one or more of a variety of sources into an integrated simulation model, said structured analysis tool outputs residing in computer databases and containing at least one data flow diagram representing a functional system, said at least one data flow diagram having at least one data flow diagram element and at least one dataflow, said method comprising the steps of:

(a) generating a standardized METAfile from said databases, said METAfile containing inter-element relations in a format suitable for reconstruction into a simulation model format on another host computer having a simulation generation program residing therein, said METAfile automatically generated by:

(i) accessing said computer databases of said structured analysis tools outputs;

(ii) accessing said at least one data flow diagram element from said at least one data flow diagram;

(iii) ascertaining and storing a first set of information related to said data flow diagram element;

(iv) determining if said dataflows are entering or exiting said data flow diagram element;

(v) ascertaining and storing a second set of information related to said dataflow; and (vi) determining if there are any remaining said dataflows, said data flow diagram elements, and said data flow diagrams, if there are remaining said dataflows repeat steps (iv) through (vi), if there are remaining said data flow diagram elements repeat steps (ii) through (vi) and if there are remaining said data flow diagrams repeat steps (i) through (vi);

(b) transporting said standardized METAfile into said another host computer having said simulation generation program and automatically generating a simulation model from said METAfile, said simulation model comprising simulation source code statements; and, (c) integrating actual source code into said simulation model by automatically replacing components said simulation source code statements with actual source code to form said integrated simulation model.

2. The method for automatically converting structured analysis tool outputs into an intergrated simulation model according to claim 1, wherein said step of accessing the data base for a data flow diagram comprises searching through the data base of said structured analysis tools to locate the generated data flow diagrams.

3. The method for automatically converting structured analysis tool outputs into an intergrated simulation model according to claim 2, wherein said step of accessing a data flow diagram element from said data flow diagram comprises searching through the data base of said structured analysis tools to locate said data flow diagram element corresponding to said data flow diagram.

4. The method for automatically converting structured analysis tool outputs into an intergrated simulation model according to claim 3, wherein said step of ascertaining and storing said first set of information related to said data flow diagram element comprises searching through the data base of said structured analysis tool to locate all relevant information pertaining to said data flow diagram element.

5. The method for automatically converting structured analysis tool outputs into an intergrated simulation model according to claim 4, wherein said all relevant information comprises a block type and one or more processing time parameters associated with said data flow diagram element.

6. The method for automatically converting structured analysis tool outputs into an intergrated simulation model according to claim 5, wherein said block type and said processing time parameters are entered into a parameter list for said data flow diagram element.

7. The method for automatically converting structured analysis tool outputs into an intergrated simulation model according to claim 4, wherein said step of determining if dataflows are entering or exiting said data flow diagram element comprises searching through the data base of said structured analysis tools to locate all input and output dataflows associated with said data flow diagram element.

8. The method for automatically converting structured analysis tool outputs into an intergrated simulation model according to claim 7, wherein said step ascertaining and storing said second set of information related to said dataflow comprises searching through the data base of said structured analysis tools to locate all relevant information pertaining to said dataflows.

9. The method for automatically converting structured analysis tool outputs into an intergrated simulation model according to claim 8, wherein said all relevant information comprises a data rate and a data size of said dataflows.

10. The method for automatically converting structured analysis tool outputs into an intergrated simulation model according to claim 9, wherein said data rate and said data size are entered into a parameter list for said dataflows.

11. The method for automatically converting structured analysis tool outputs into an intergrated simulation model according to claim 8, wherein said step of determining if there are any remaining dataflows, data flow diagram elements and data flow diagrams comprises searching through the data base of said structured analysis tools to determine if there are any remaining dataflows associated with a particular data flow diagram element, if there are any remaining data flow diagram elements associated with a particular data flow diagram and if there are any remaining data flow diagrams to convert.

12. The method for automatically converting structured analysis tool outputs into an intergrated simulation model according to claim 11, wherein said step of automatically generating a simulation model from said METAfile comprises the steps of:
  (a) accessing said METAfile for a METAfile element;
  (b) determining a block type of said METAfile element;
  (c) converting said METAfile element into a corresponding simulation component based on the particular block type of said METAfile element;
  (d) determining if said dataflows are entering or exiting said METAfile element;
  (e) ascertaining and storing said second set of information related to said dataflows; and
  (f) determining if there are any remaining said dataflows, if there are remaining said dataflow steps (a) through (f) are repeated.

13. The method for automatically converting structured analysis tool outputs into an intergrated simulation model according to claim 12, wherein said step of accessing said METAfile for a METAfile element comprises searching through said METAfile to locate said METAfile element.

14. The method for automatically converting structured analysis tool outputs into an intergrated simulation model according to claim 13, wherein said step of determining the block type of said METAfile element comprises searching the METAfile to locate said parameter list for said data flow diagram element to determine the particular block type of said METAfile element.

15. The method for automatically converting structured analysis tool outputs into an intergrated simulation model according to claim 14, wherein said step of converting said METAfile element into a corresponding simulation component based on the particular block type of said METAfile element comprises creating a plurality of simulation blocks of said simulation source code based on whether the block type is determined to be a SOURCE, PROCESS, or SINK.

16. The method for automatically converting structured analysis tool outputs into an intergrated simulation model according to claim 15, wherein said step of determining if dataflows are entering or exiting said METAfile element comprises the steps of:
  (a) searching through said METAfile to locate all said input and output dataflows associated with said METAfile element; and
  (b) determining if said dataflow is an input dataflow or an output dataflow.

17. The method for automatically converting structured analysis tool outputs into an intergrated simulation model according to claim 16, wherein said step of ascertaining and storing said second set of information related to said dataflows comprises searching the METAfile to locate said parameter list for said dataflow to determine all relevant information pertaining to said dataflow.

18. The method for automatically converting structured analysis tool outputs into an intergrated simulation model according to claim 17, wherein said all relevant information comprises the data rate and the data size of said dataflow, said relevant information is stored in tabular form.

19. The method for automatically converting structured analysis tool outputs into an intergrated simulation model according to claim 18, wherein said step of determining if there are any remaining dataflows comprises searching through the METAfile to determine if there are no remaining dataflows and the METAfile contains more METAfile elements, then the steps of claim 12 are repeated, if there are no remaining dataflows and the METAfile contains no more METAfile elements then the process is terminated.

20. The method for automatically converting structured analysis tool outputs into an intergrated simulation model according to claim 19, wherein the step of automatically integrating code into said simulation model by replacing the simulation component representing code with actual code comprises replacing one of said simulation blocks with a HELP block, said HELP block accesses the actual source code that performs the specific function.

21. A software design and modelling system for automatically generating integrated simulation/source code models from structured analysis tools outputs from one or more of a variety of sources, said structured analysis tools outputs residing in computer databases and containing at least one data flow diagram representing a functional system, said at least one data flow diagram having one or more data flow diagram elements and one or more dataflows entering or exiting said data flow diagram elements, said software design and modelling system comprising:
  (a) means for accessing said computer databases of said structured analysis tools outputs to obtain therefrom said one or more data flow diagram elements from said at least one data flow diagram;
  (b) means for searching through said databases to obtain one or more first sets of information corresponding to each of said one or more data flow diagram elements, each of said first sets of information comprising block type and processing time parameters associated with each respective said data flow diagram element;
  (c) means for determining if said one or more dataflows are entering or exiting each of said one or more of said data flow diagram elements, said means for searching through said databases to obtain therefrom one or more second sets of information corresponding to said one or more dataflows upon a determination that said one or more dataflows exists, each of said second sets of information comprising data size and data rate parameters associated with each respective said dataflows;
  (d) means for automatically generating a standardized METAfile from said one or more dataflow diagram elements, said one or more dataflows entering or exiting therefrom, and said first sets of information and said second sets of information corresponding therewith, said standardized METAfile containing one or more interrelated elements in a format suitable for reconstruction into a simulation model format on any host computer;
  (e) means for transporting said standardized METAfile into said another host computer;
  (f) means residing on said another host computer for automatically generating a simulation model from said standardized METAfile, said simulation model comprising simulation source code statements; and,
  (g) means for automatically integrating actual source code into said simulation model by replacing components said simulation source code statements with said actual source code to form said integrated simulation/source code model.

22. The software design and modelling system of claim 21, wherein said at least one structured analysis tools output is a data dictionary.

23. The software design and modelling system of claim 21, wherein said at least one structured analysis tools output is a mini-specification.

24. The software design and modelling system of claim 23, wherein said intergrated simulation/source code model is an operational behavioral simulation model having a combination of simulation code and application source code for testing the application source code in a simulation environment.

* * * * *

UNITED STATES PATENT AND TRADEMARK OFFICE
CERTIFICATE OF CORRECTION

PATENT NO. : 5,390,320
DATED : February 14, 1995
INVENTOR(S) : Edward T. Smithline It is certified that error appears in the above-indentified patent and that said Letters Patent is hereby corrected as shown below:

```
        Column 6, line 44:   "14300"  should read --4300--
        Column 13, line 20:  "BIT-SYNCHRONIZ)" should read
--BIT__SYNCHRONIZ)--
        Columns 13 & 14, Table 5:   Lines 3, 5, 6, 7, 9, 11, 12,
14, 15, 16, 18, 19, 20, 22, 23, 24, 26, 27, 28, 30, 31, 32, 33,
35, 36, 37, 39, 40 & 41, should be in bold face type to
distinguish them from the non-bold face type.
        Column 20, line 63, Claim 2:   "intergrated"  should
read --integrated--
        Column 21, line 2, Claim 3:   "intergrated"  should
read --integrated--
        Column 21, line 10, Claim 4:   "intergrated"  should
read --integrated--
        Column 21, line 18, Claim 5:   "intergrated"  should
read --integrated--
        Column 21, line 24, Claim 6:   "intergrated"  should
read --integrated--
        Column 21, line 29, Claim 7:   "intergrated"  should
read --integrated--
        Column 21, line 38, Claim 8:   "intergrated"  should
read --integrated--
```

UNITED STATES PATENT AND TRADEMARK OFFICE
CERTIFICATE OF CORRECTION

PATENT NO. : 5,390,320
DATED : February 14, 1996
INVENTOR(S) : Edward T. Smithline It is certified that error appears in the above-indentified patent and that said Letters Patent is hereby corrected as shown below:

Column 21, line 45, Claim 9: "intergrated" should read --integrated--
Column 21, line 50, Claim 10: "intergrated" should read --integrated--
Column 21, line 55, Claim 11: "intergrated" should read --integrated--
Column 21, line 67, Claim 12: "intergrated" should read --integrated--
Column 22, line 18, Claim 13: "intergrated" should read --integrated--
Column 22, line 24, Claim 14: "intergrated" should read --integrated--
Column 22, line 32, Claim 15: "intergrated" should read --integrated--
Column 22, line 41, Claim 16: "intergrated" should read --integrated--
Column 22, line 51, Claim 17: "intergrated" should read --integrated--
Column 22, line 59, Claim 18: "intergrated" should read --integrated--

UNITED STATES PATENT AND TRADEMARK OFFICE
CERTIFICATE OF CORRECTION

PATENT NO.    : 5,390,320
DATED         : February 14, 1996
INVENTOR(S)   : Edward T. Smithline It is certified that error appears in the above-indentified patent and that said Letters Patent is hereby corrected as shown below:

```
        Column 22, line 65, Claim 19:  "intergrated"  should
read --integrated--
        Column 23, line 5, Claim 19:   delete "process"  and
insert --search through the METAfile--
        Column 23, line 7, Claim 20:  "intergrated"  should
read --integrated--
        Column 24, line 25, Claim 21:  after "components"  insert
--of--
```

Signed and Sealed this

Eighteenth Day of June, 1996

BRUCE LEHMAN

*Attest:*

*Attesting Officer*  *Commissioner of Patents and Trademarks*